United States Patent

Momna et al.

Patent Number: 5,908,900
Date of Patent: *Jun. 1, 1999

[54] ELASTICITY IMPARTING AGENTS FOR PAINTS, A METHOD OF MANUFACTURE AND PAINTS

[75] Inventors: Yasuhrio Momna, Chigasaki; Yasushi Sugihara; Kishio Shibato, both of Yokohama, all of Japan

[73] Assignee: BASF Coatings AG, Muenster-Hiltrup, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/693,075
[22] PCT Filed: Feb. 6, 1995
[86] PCT No.: PCT/EP95/00412
§ 371 Date: Aug. 13, 1996
§ 102(e) Date: Aug. 13, 1996
[87] PCT Pub. No.: WO95/21895
PCT Pub. Date: Aug. 17, 1995

[30] Foreign Application Priority Data

Feb. 14, 1994 [JP] Japan .................................. 6-017627

[51] Int. Cl.⁶ .......................... C08G 18/28; C08G 18/06; C08C 19/22; B05D 5/00
[52] U.S. Cl. ...................... 525/330.5; 525/379; 524/507; 524/558; 526/320; 427/388.5; 427/393.5
[58] Field of Search ..................... 524/558; 526/320; 525/330.5, 379; 427/388.5, 393.5; 523/437

[56] References Cited

U.S. PATENT DOCUMENTS

| | | | |
|---|---|---|---|
| 4,340,511 | 7/1982 | Backhouse et al. | 524/504 |
| 4,493,914 | 1/1985 | Chattha | 523/437 |
| 4,808,656 | 2/1989 | Kania et al. | 524/558 |
| 4,845,147 | 7/1989 | Blum et al. | 524/461 |
| 5,093,390 | 3/1992 | Shibato et al. | 524/558 |
| 5,093,408 | 3/1992 | Jung et al. | 524/558 |
| 5,198,503 | 3/1993 | Numa et al. | 525/330.5 |
| 5,342,878 | 8/1994 | Das et al. | 524/558 |
| 5,346,958 | 9/1994 | Yukawa et al. | 525/328.8 |

FOREIGN PATENT DOCUMENTS

| | | |
|---|---|---|
| 0 285 973 A3 | 3/1988 | European Pat. Off. . |
| 0 531 058 A3 | 8/1992 | European Pat. Off. . |
| 0 567 039 A3 | 4/1993 | European Pat. Off. . |
| WO94/09916 | 11/1994 | European Pat. Off. . |
| 1.570.799 | 6/1969 | France . |
| 2 025 992 | 6/1979 | United Kingdom . |

*Primary Examiner*—Tae Yoon

[57] ABSTRACT

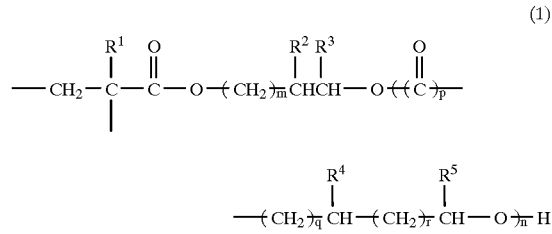

To obtain elasticity imparting agents for paints comprised of liquid non-aqueous polymer dispersions which, when added to paints, improve the scratch resistance without lowering the acid resistance of the hardened paint film. A liquid non-aqueous polymer dispersion which contains (a) 40–90 percent by weight organic solvent, (b) 10–50 percent by weight particle component comprised vinyl based copolymer which contains 30 percent by weight or more of structural units of formula (1), and (c) 5–40 percent by weight dispersion stabilizer for dispersing the (b) component in the (a) component. In formula (1) $R^1$–$R^5$ are H or methyl groups, m is 0–2, n is 0–10, p is 0 or 1, q is 0–3 and r is 0–3.

18 Claims, No Drawings

ELASTICITY IMPARTING AGENTS FOR PAINTS, A METHOD OF MANUFACTURE AND PAINTS

FIELD OF THE INVENTION

This invention concerns elasticity imparting agents for paints for imparting a rubber elasticity to paint films, and especially elasticity imparting agents for paints for adding to a paint and improving the scratch resistance of the paint film, a method for their manufacture and paints in which they are used.

BACKGROUND OF THE INVENTION

In recent years, in the field of automobile paints for example, problems have arisen with a loss of quality of the appearance of paint films due to chemical and physical factors such as etching with acid rain and scratching when washing the paint film for example. In order to resolve these problems, acrylic-melamine based top coat paint compositions into which soft segments have been introduced by the conjoint use of ε-caprolactam modified acrylic resins, specified low molecular weight polyols and alkoxy monomeric melamine have been suggested as essential structural materials for paint films (for example, Japanese Patent Kokai 6466274).

However, with these paint compositions, the paint film is softened because the paint film forming resin itself has been modified with caprolactone and the scratch resistance can be improved, but the acid resistance is reduced because alkoxy monomeric melamine is used, and this is unsatisfactory for dealing with today's severe acid rain.

Furthermore, top coat paint compositions in which ε-caprolactam modified acrylic resin and non-yellowing type block polyisocyanate compounds are essential components have been suggested for the same purpose (for example, Japanese Patent Kokai H2-305873).

However, although both the scratch resistance and the acid resistance are improved with these paint compositions, the paint films tend in fact to yellow even though only to a slight extent because of the use of the block polyisocyanate compounds as crosslinking agents, even though they are said to be of the non-yellowing type.

SUMMARY OF THE INVENTION

The aim of this present invention is to provide elasticity imparting agents which do not reduce the acid resistance of the paint film, which impart rubber elasticity, with which the scratch resistance of the paint film can be improved, and with which, even in those cases where a block isocyanate is used as a hardening agent for the paint film, the amount used is small and yellowing is unlikely to occur, a method for their manufacture, and paints.

DETAILED DESCRIPTION

The present inventions are the elasticity imparting agents for paints, the method for their manufacture, and the paints indicated below.

(1) Elasticity imparting agent for paint, characterized in that it contains polymer particles comprised of vinyl based polymer which contains structural units which can be represented by the general formula [1]

General Formula [1]

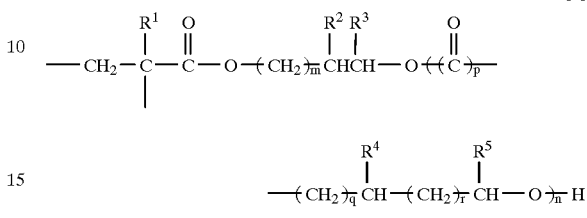

(In this formula, $R^1$–$R^5$ each represent a hydrogen atom or a methyl group, and they may be the same or different. Moreover, m is an integer of value 0–2, n is a number of value 0–10, p is 0 or 1, q is an integer of value 0–3, and r is an integer of value 0–3.)

(2) Elasticity imparting agent for paint, characterized in that it is comprised of a liquid non-aqueous polymer dispersion which contains:

(a) 40–90 percent by weight of organic solvent;

(b) 10–50 percent by weight of a particle component comprising polymer particles, which are comprised of vinyl based polymer which contains structural units which can be represented by the aforementioned general formula [1] and in which the structural units of the aforementioned general formula [1] account for at least 30 percent by weight of the aforementioned vinyl based polymer; and (c) 5–40 percent by weight of dispersion stabilizer.

(3) Elasticity imparting agent as described in (1) or (2) above wherein the vinyl based polymer is a crosslinked polymer.

(4) Method for the manufacture of elasticity imparting agents for paints as described in any of (1)–(3) above, characterized in that vinyl based monomer is polymerized in organic solvent and a dispersion stabilizer formed, and that a vinyl based monomer which can be represented by general formula [2], or a group of monomers including such vinyl monomer, is polymerized in the reaction solution so obtained and polymer particles are formed.

General Formula [2]

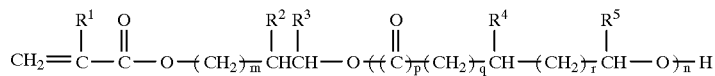

(In this formula, $R^1$–$R^5$ and m, n, p, q and r have the same significance as in the aforementioned general formula [1].)

(5) Paint, characterized in that it contains, among the paint components, an elasticity imparting agent for paints as described in any of (1) to (3) above.

In this present invention, "(meth)acrylic" signifies "acrylic or methacrylic".

The elasticity imparting agents for paints of this present invention are agents which contain polymer particles which are comprised of vinyl based polymer which contains structural units which can be represented by the aforementioned general formula [1]. The vinyl based polymer is such that structural molecules of the polymer particles move easily because there are soft segments such as the side chains, for example the side chains originating from the lactones, in the aforementioned general formula [1], and when such polymer particles are added to a paint and a paint film is formed, the polymer particles are in a dispersed state in the paint film and they impart rubber elasticity to the paint film. Since, in this case, the structure is such that the polymer particles which have soft segments partially cover the paint film forming resin, the acid resistance is not reduced even in those cases where melamine is used in the paint film formation.

Elasticity imparting agents for paints of this type are preferably manufactured in the form of a liquid non-aqueous polymer dispersion in which the polymer is dispersed in an organic solvent with a dispersion stabilizer, and added to the paint in the form of a liquid non-aqueous polymer dispersion.

No limitation is imposed upon the organic solvent of the (a) component in the aforementioned liquid non-aqueous polymer dispersion, provided that it does not dissolve the particle component of the (b) component and does dissolve the dispersion stabilizer of the (c) component, and examples include aliphatic hydrocarbons such as n-hexane, cyclohexane, methylcyclohexane, ethylcyclohexane, n-heptane, n-octane and mineral spirit, aromatic hydrocarbons such as benzene, toluene, xylene and ethylbenzene, alcohols such as methyl alcohol, ethyl alcohol, propyl alcohol, isopropyl alcohol, butyl alcohol and isobutyl alcohol, esters such as methyl acetate, ethyl acetate, propyl acetate, isopropyl acetate, butyl acetate, isobutyl acetate, hexyl acetate, heptyl acetate, octyl acetate and cellosolve acetate, ketones such as acetone, methyl ethyl ketone, methyl isobutyl ketone, methyl amyl ketone, cyclohexanone and isophorone, and liquid mixtures of these solvents.

If, from among these solvents, an organic solvent of low polarity within the range such that the dispersion stabilizer of the (c) component is dissolved, for example the aforementioned aliphatic hydrocarbons and aromatic hydrocarbons, is used then a liquid non-aqueous polymer dispersion of high stability is obtained, and this is desirable.

The amount of the organic solvent (a) component used is within the range 40–90 percent by weight, and preferably within the range 50–80 percent by weight, with respect to the total weight of the liquid non-aqueous polymer dispersion. In those cases where the (a) component is below the lower limit value indicated above, the dispersion stability of the liquid non-aqueous polymer dispersion is reduced and so this is undesirable. Furthermore, in those cases where the upper limit is exceeded, the concentration of the involatile fraction of the paint is reduced when it is added to the paint and this is inappropriate in terms of the need for conserving resources and so it is undesirable.

The particle component of the (b) component which is used in the invention is comprised of particles of vinyl based polymer which contains structural units which can be represented by the aforementioned general formula [1], and it does not dissolve in the organic solvent (a) and is present in a dispersed state. No particular limitation is imposed upon the shape of the particles. The particle size is preferably 0.01–5 μm, and most desirably 0.05–2 μm.

The vinyl based polymer from which the particle component (b) is constructed is a homopolymer or copolymer which contains, in the vinyl based polymer, at least 30 percent by weight, and preferably 40–90 percent by weight, of structural units which can be represented by the aforementioned general formula [1]. In those cases where this structural unit content is below the lower limit value indicated above, with a paint in which the elasticity imparting agent for paints of this present invention has been used, the effect of improving the scratch resistance without reducing the acid resistance of the finally hardened paint film is inadequate, and this is undesirable.

Vinyl based polymers of this type can be obtained by the homopolymerization of a vinyl monomer which can be represented by the aforementioned general formula [2], or by copolymerizing such vinyl based monomers, or by copolymerizing such vinyl based monomers with other copolymerizable monomers.

Vinyl monomers which can be represented by the aforementioned general formula [2] include, for example, hydroxyalkyl esters of (meth)acrylic acid, such as 2-hydroxyethyl (meth)acrylate, 2-hydroxypropyl (meth) acrylate, 3-hydroxypropyl (meth)acrylate and 4-hydroxybutyl (meth)acrylate; lactone adduct monomers obtained by the ring opening addition of lactones such as ε-caprolactone, β-propiolactone, β-butyrolactone, γ-butyrolactone, pivalolactone, γ-valerolactone and δ-valerolactone, or mixtures thereof, in an amount of 1–10 mol, with 1 mol of these hydroxyalkyl esters of (meth) acrylic acid, or mixtures thereof; and alkylene oxide adducts obtained by the ring opening addition of 2–10 mol of alkylene oxides such as ethylene oxide and propylene oxide, or mixtures thereof, with 1 mol of (meth)acrylic acid.

No limitation is imposed upon the other monomers which can be copolymerized with the vinyl based monomers which are represented by the aforementioned general formula [2], provided that they are compounds which can be copolymerized with the vinyl based monomers which are represented by the aforementioned general formula [2], and other vinyl compounds which are not included in the aforementioned general formula [2], and compounds which have unsaturated bonds, for example, can be cited as such monomers.

Actual examples of other monomers of this type include alkyl esters of (meth)acrylic acid, such as methyl (meth) acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth) acrylate, cyclohexyl (meth)acrylate, 2-ethylhexyl (meth) acrylate, lauryl (meth)acrylate and stearyl (meth)acrylate; and glycidyl (meth)acrylate, 2-hydroxyethyl (meth)acrylate, 2-hydroxypropyl (meth)acrylate, (meth)acrylic acid, (meth) acrylamide, N-hydroxymethyl(meth)acrylamide, (meth) acrylonitrile, vinyl acetate, vinyl propionate, vinyl butyrate, vinyl caproate, vinyl 2-ethylhexanoate, vinyl laurate, vinyl stearate, styrene, vinyltoluene, vinylpyrrolidone, itaconic acid, crotonic acid, fumaric acid, maleic acid, butadiene, vinyl chloride, vinylidene chloride, dibutyl fumarate, maleic acid anhydride, dodecylsuccinic acid anhydride, allyl glycidyl ether and allyl alcohol.

Copolymerization of the lactone adducts of 2-hydroxyethyl (meth)acrylate, the alkylene oxide adducts of meth(acrylic) acid or 4-hydroxybutyl (meth)acrylate, which are especially desirable as the vinyl based monomer of general formula [2], with the alkyl esters of (meth)acrylic acid, glycidyl (meth)acrylate, (meth)acrylic acid, styrene and (meth)acrylonitrile as the vinyl based monomer other than that of general formula [2] is preferred for the vinyl based polymer. In this case, the vinyl based monomer of general formula [2] is used in an amount of 5–90 mol. %, and preferably in an amount of 10–80 mol. %, and the other monomer is used in an amount of 10–95 mol. %, and preferably in an amount of 20–90 mol. %.

A vinyl based polymer which is insoluble, or only sparingly soluble, in the organic solvent (a) is obtained by the homopolymerization or copolymerization of the vinyl based monomer or monomer mixture as indicated above, and this can be used as the particle component (b). In this case, it is desirable that a completely insoluble vinyl based polymer is obtained by intramolecular or intermolecular crosslinking, and that this is used for the particle component (b).

Crosslinked vinyl based copolymers can be obtained, for example, using the following methods:

1) Methods in which polyfunctional monomers are used as monomers.
2) Methods in which crosslinkable monomers which have functional groups which can crosslink together are used as monomers.
3) Methods in which crosslinking is carried out using a crosslinking agent which can react with hydroxy groups.

From among these methods, those indicated under 3) above are preferred.

The methods in 1) above are methods of crosslinking by making use of polyfunctional monomers during the polymerization of the vinyl based polymer. Examples of polyfunctional monomers include acrylo-nitrile, ethyleneglycol di (meth) acrylate, trimethylol-propane tri(meth)acrylate, divinylbenzene, diethyleneglycol di(meth)acrylate, 1,4-butanediol di(meth)acrylate, 1,3-butyleneglycol di(meth) acrylate, 1,5-pentanediol di(meth)acrylate, 1,6-hexanediol di(meth)acrylate, pentaerythritol tri(meth)acrylate and pentaerythritol tetra(meth)acrylate.

Apart from these, use can also be made of adducts of hydroxy group containing vinyl based compounds, such as 2-hydroxyethyl (meth)acrylate, 2-hydroxypropyl (meth) acrylate, 3-hydroxypropyl (meth)acrylate, 4-hydroxybutyl (meth)acrylate, polyethyleneglycol mono(meth)acrylate, polypropyleneglycol mono (meth)acrylate, adducts of 2-hydroxyethyl (meth)acrylate and ε-caprolactam or adducts of 2-hydroxypropyl (meth)acrylate and ε-caprolactam for example, with polyisocyanate compounds, such as hexamethylene diisocyanate, isophorone diisocyanate, tolylene diisocyanate, xylylene diisocyanate, m-xylylene diisocyanate, diphenylmethane diisocyanate, 2,6-diisocyanatomethylcaproate, 4,4'-methylenebis (cyclohexylisocyanate), methylcyclohexane-2,4-diisocyanate, methylcyclohexane-2,6-diisocyanate, 1,3-(isocyanatomethyl)cyclohexane, trimethylhexane diisocyanate or dimer acid diisocyanate for example. From among these, diethyleneglycol di(meth)acrylate, 1,4-butanediol di(meth)acrylate, 1,3-butyleneglycol di(meth) acrylate, 1,5-pentanediol di(meth)acrylate and 1,6-hexanediol di(meth)acrylate, for example, are preferred.

The methods in 2) above are methods in which crosslinking is achieved using a combination of crosslinkable monomers which have functional groups which can crosslink together during the copolymerization of the vinyl based monomer. Examples of combinations of crosslinkable monomers include combinations of crosslinkable monomers which have carboxyl groups, such as (meth)acrylic acid, itaconic acid, crotonic acid, fumaric acid and maleic acid for example, with crosslinkable monomers which have epoxy groups, such as glycidyl (meth)acrylate and allyl glycidyl ether for example.

The methods in 3) above are methods in which crosslinking is achieved using a crosslinking agent which can react with hydroxy groups such as the terminal hydroxy groups of the structural units which can be represented by the aforementioned general formula [1] during the copolymerization of the vinyl based monomer. Polyisocyanate compounds such as, for example, hexamethylene diisocyanate, isophorone diisocyanate, tolylene diisocyanate, xylylene diisocyanate, m-xylylene diisocyanate, diphenylmethane diisocyanate, 2,6-diisocyanatomethylcaproate, 4,4'-methylenebis(cyclohexylisocyanate), methylcyclohexane-2,4-diisocyanate, methylcyclohexane-2,6-diisocyanate, 1,3-(isocyanatomethyl)cyclohexane, trimethylhexane diisocyanate and dimer acid diisocyanate can be cited as examples of crosslinking agents of this type. However, the structural units represented by the aforementioned general formula [1] must be included in the aforementioned amount in the vinyl based polymer after crosslinking.

There are also methods in which vinyl monomers which can be represented by the aforementioned general formula [2] are not used for obtaining the vinyl based monomers from which the particle component (b) is constructed, such as, for example, the methods in which the side chain parts of the structural units represented by the aforementioned general formula [1] are added after synthesizing the polymer. In practical terms, there are the methods in which the aforementioned lactones are subjected to ring opening addition to a polymer which has at least the hydroxyalkyl ester of (meth)acrylic acid as mentioned earlier as a monomer, and the methods in which the aforementioned alkylene oxides are subjected to ring opening addition to a polymer in which at least (meth)acrylic acid forms a monomer component.

The proportion of particle component (b) in the liquid non-aqueous polymer dispersion in this present invention is 10–50 percent by weight, and preferably 10–40 percent by weight, with respect to the total amount of liquid non-aqueous polymer dispersion. In those cases where the amount of particle component (b) is less than the lower limit value indicated above, the amount of the liquid non-aqueous polymer dispersion which is added to the paint to improve the scratch resistance without lowering the acid resistance of the paint film is considerable and so this is economically disadvantageous. Furthermore, in those cases where the amount exceeds the upper limit value, it is difficult to achieve stable dispersion in the liquid non-aqueous polymer dispersion and so this is undesirable.

The vinyl based monomer from which the particle component (b) is constructed can be manufactured using a method in which vinyl based monomer which can be represented by the aforementioned general formula [2], and other monomer which is being used, as required, is subjected to radical polymerization, using the aforementioned organic solvent (a) as a reaction medium, in the presence of the (c) component, by means of the non-aqueous dispersion (NAD) method described hereinafter.

The dispersion stabilizer of the (c) component which is used in this present invention is soluble in the aforementioned organic solvent (a) and disperses the particle component (b) in a stable manner in the organic solvent (a). Polymers which are soluble in the organic solvent (a) and which have an affinity for the particle component (b) can be used for the dispersion stabilizer (c) of this type.

Actual examples of the dispersion stabilizer (c) are polymers in which methyl (meth)acrylate, ethyl (meth)acrylate, n-propyl (meth)acrylate, isopropyl (meth)acrylate, n-butyl (meth)acrylate, isobutyl (meth)acrylate, t-butyl (meth) acrylate, n-hexyl (meth)acrylate, cyclohexyl (meth)acrylate, 2-ethylhexyl (meth)acrylate, lauryl (meth)acrylate, stearyl (meth)acrylate, glycidyl (meth)acrylate, 2-hydroxyethyl (meth)acrylate, 2-hydroxypropyl (meth)acrylate, (meth) acrylic acid, (meth)acrylamide, vinyl acetate, vinyl propionate, vinyl butyrate, vinyl caproate, vinyl 2-ethylhexanoate, vinyl laurate, vinyl stearate, styrene, vinyl toluene, dibutyl fumarate, dodecyl succinic acid anhydride, allyl glycidyl ether and also the adduct of (meth)acrylic acid and versatic acid glycidyl ester or the adduct of glycidyl (meth)acrylate and poly-12-hydroxystearic acid are used as monomers (referred to hereinafter as monomers for the (c) component), being those which are soluble in the organic solvent (a). From among these, the alkyl esters of carbon number at least 4 of (meth)acrylic acid, the adduct of (meth)acrylic acid and versatic acid glycidyl esters and the adduct of glycidyl (meth)acrylate and poly-12-hydroxystearic acid are especially desirable.

The proportion of the dispersion stabilizer (c) in the liquid non-aqueous polymer dispersion in this present invention is 5–40 percent by weight, and preferably 5–30 percent by weight, with respect to the total weight of the liquid non-aqueous polymer dispersion. In those cases where the amount of dispersion stabilizer (c) is below the lower limit indicated above, it is difficult to disperse the particle component (b) in a stable manner, and so this is undesirable. Furthermore, in those cases where the amount exceeds the upper limit value, the amount of liquid non-aqueous polymer dispersion added to a paint to improve the scratch resistance without reducing the acid resistance of the paint film becomes considerable and so this is economically disadvantageous.

The liquid non-aqueous polymer dispersion in this present invention can be manufactured by taking the organic solvent (a) as a reaction medium and first preparing the dispersion stabilizer (c) by polymerizing the monomer for the (c) component using a radical solution polymerization method, and then forming the particle component (b) by adding the monomer for the (b) component to the reaction solution and carrying out non-aqueous dispersion polymerization using the known NAD method. In this case, raw materials of lower polarity are preferably selected for the organic solvent (a) and the monomer of the (c) component, and raw materials of higher polarity are preferably selected for the monomer for the (b) component in order to form the particle component (b) in a stable manner. In this case, particles which are insoluble in the organic solvent are formed for the (b) component on the basis of the difference in polarity, but the extent of the insolubility can be raised further by using a crosslinkable monomer for the monomer of the (b) component and realizing internal crosslinking.

The paints of this present invention are paints in which the abovementioned elasticity imparting agents are included among the paint components. Paints in which an elasticity imparting agent is compounded with the paint components in the form of a liquid non-aqueous polymer dispersion are preferred for the paint. Rubber elasticity can be imparted to a paint film by including an elasticity imparting agent among the paint components, and the scratch resistance of the paint film is improved by this. It is conjectured that the reason for this is that, since the vinyl based polymer from which the particle component (b) is constructed includes structural units which can be represented by the aforementioned general formula [1], they are polymers which have rubber elasticity due to the soft segments and, by dispersing the particles uniformly in the paint with a dispersion stabilizer, rubber elasticity can be imparted in a chemically stable manner to the hardened paint film. In this case, there is no effect on the other properties of the paint film and, for example, the acid resistance is not reduced.

With a conventional paint of which the scratch resistance has been improved, the paint film forming resin which becomes the matrix itself is modified with lactones for example and soft segments are formed, and rubber elasticity is imparted by these soft segments, and since melamine is used to crosslink such paint film forming resins it can be anticipated that the acid resistance will be reduced. On the other hand, with the paints which contain an elasticity imparting agent of this present invention, the elasticity imparting agent of this present invention is comprised of rubber-like particles which have soft segments, and the particles which have an easily mobile structure are dispersed in the paint film and impart rubber elasticity to the paint film, and a state in which the particles which have soft segments partially cover the paint film forming resin which forms the matrix of the paint film is adopted and so, even in cases where melamine is used, it can be anticipated that there will be virtually no fall in the acid resistance and no reduction in the other paint film properties.

In this way, paints of this present invention are paints in which polymer particles, as an elasticity imparting agent for paints which is independent of the paint film forming resin, are dispersed in the paint film forming resin and impart elasticity, and there is no limitation on the paint components to which the elasticity imparting agents of the invention can be added, provided that the paint components exhibit compatibility. The components generally used in paints can be used as they are as paint components of this type, and examples include acrylic based paints, polyester based paints, alkyd based paints, polyurethane based paints, epoxy based paints, fluorine based paints, silicon based paints and cellulose based paints. These may be of the thermoplastic type or of the thermosetting type. Such paints may contain pigments, solvents and other additives in addition to the paint film forming resin.

No particular limitation is imposed upon the amount of the elasticity imparting agent for paints which is added, but introduction in such an amount that the content of the elasticity imparting agent, which is to say the particle component (b) of the liquid non-aqueous polymer dispersion, in the total paint resin solid fraction is in the range 5–30 percent by weight, and preferably in the range 10–25 percent by weight, is desirable, and in this case it is possible to provide a good balance of scratch resistance performance without reducing the acid resistance.

In those cases where the paint to which an elasticity imparting agent of this invention has been added is a thermosetting type, hardening agents (cross-linking agents) such as melamine resins, benzoguanamine resins, glycolyl resins, cyclohexylguanamine resins, urea resins, xylene resins, toluene resins and polyisocyanate resins, for example, can be used. In those cases where these hardening agents are used, yellowing of the paint film does not arise. It is also possible to use block isocyanate as a hardening agent but, in those cases where this is used in large quantities, yellowing does arise, and so its use in the range where yellowing does not become a problem, for example in combination with other hardening agents, is desirable. Moreover, combinations of resins which have functional groups which can crosslink together, for example polyepoxy compounds and polycarboxylic acid compounds, or polyoxazoline compounds and polycarboxylic acid compounds, can also be used, and auto-crosslinking resins such as polyalkoxysilanes can also be used.

To form a paint using an elasticity imparting agent of this present invention, the elasticity imparting agent is added in the form of a liquid non-aqueous polymer dispersion to the paint components which are to be mixed, and the paint can then be prepared by mixing using the mixers which are normally used for the manufacture of paints, such as a ball mill, a paint shaker, a sand mill, an attriter, a roll mill or a kneader for example. Pigments, dyes, glass flakes, aluminum flakes and additives which are normally used in paints, for example, can also be added at this time, as required. Examples of additives include dispersants, viscosity adjusting agents, leveling agents, anti-gelling agents, hardening catalysts, ultraviolet absorbers, photo-stabilizers and antioxidants.

The paints obtained in this way can be painted onto the usual materials which can be painted, such as metals and other inorganic materials and plastics and other organic materials, using methods such as air spray painting, airless spray painting, electrostatic painting or dip painting, for example, using a one-coat one-bake, two-coat one-bake, two-coat two-bake, three-coat two-bake, four-coat two-bake system for example, and a hardened paint film which has improved scratch resistance without reduction of acid resistance can be obtained by drying for 10–60 minutes at a temperature of 80–180° C. for example.

EFFECT OF THE INVENTION

The elasticity imparting agents for paints of this present invention are comprised of polymer particles which have structural units which can be represented by the aforementioned general formula [1], and so they can be added to paints of the so-called type (sic) and impart rubber elasticity to the paint film. In this case, the polymer particles which have rubber elasticity are independent of the paint film forming resin which forms the matrix, and the paint film is produced in a form such that this is partially covered, and so even in those cases where melamine is used as a crosslinking agent for paint film formation, there is no reduction in acid resistance and no reduction in the other paint film properties.

The elasticity imparting agents for paints which are comprised of liquid non-aqueous polymer dispersions of this present invention are such that the polymer component which is comprised of vinyl based polymer which contains a specified amount of specified structural units is dispersed in a stable manner by means of a dispersion stabilizer and so production is simple, and when added to a paint composition they can improve scratch resistance of the hardened paint film without reduction of the acid resistance. Furthermore, even in those cases where block isocyanates, which are a cause of yellowing in the paint films, are used, the amount which is used can be reduced by adding an elasticity imparting agent for paints of this present invention and so the paint film is less liable to yellowing.

The method of manufacture of an elasticity imparting agent for paints of this present invention involves synthesizing a dispersion stabilizer in an organic solvent and then polymerizing the polymer particle component in this reaction solution, and so a fine particle component can be formed in a state which has good dispersion stability, and the liquid non-aqueous polymer dispersion obtained can be added as it is as an elasticity imparting agent for paints to the paint components.

The paints of this present invention contain elasticity imparting agents for paints of the type described above and so paint films of which the scratch resistance is improved and which have excellent acid resistance and other paint film properties can be obtained.

ILLUSTRATIVE EXAMPLES

Illustrative examples of the invention are described below. In these examples the term "parts" signifies "parts by weight" and the term "%" signifies "percent by weight".

Examples of Manufacture 1–6

1) Preparation of the Dispersion Stabilizer (c)

Xylene (83.0 parts) and 15.0 parts of mineral spirit were introduced into a four-necked flask which had been fitted with a stirrer, a reflux condenser, a thermometer and a dropping funnel, and the mixture was heated to 95° C. with stirring. Next, at a temperature of 95° C., a mixture of the composition indicated below was added at a constant rate of addition over a period of 3 hours. After the addition had been completed, the mixture was maintained at 95° C. for 1 hour, 0.1 part of t-butylperoxy 2-ethylhexanoate and 0.9 part of mineral spirit were added and a dispersion stabilizer solution of involatile fraction 50% was obtained by maintaining at 95° C. for a further 3 hours.

| 2-Ethylhexyl methacrylate | 65.6 | parts |
| Stearyl methacrylate | 20.0 | parts |
| 2-Hydroxypropyl methacrylate | 14.4 | parts |
| t-Butylperoxy 2-ethylhexanoate | 1.0 | part |

2. Preparation of Liquid Non-aqueous Polymer Dispersions

The dispersion stabilizer solution obtained above, xylene and mineral spirit were introduced into a four-necked flask which had been fitted with a stirrer, a reflux condenser, a thermometer and a dropping funnel in the initial proportions shown in Table 1 and Table 2, the temperature was raised, with stirring, and the mixture was heated to 95° C. Next, at 95° C., the added mixture (1) shown in Table 1 and Table 2 was added at a constant rate of addition over a period of 4 hours.

Moreover, in Examples of Manufacture 1, 3, 4 and 6, the temperature was maintained at 95° C. for 1 hour and the supplementary catalyst shown in Table 1 and Table 2 was added. After adding the supplementary catalyst, the temperature was maintained at 95° C. for a further period of 3 hours, and the liquid non-aqueous polymer dispersion (A-1, A-3, A-4 or A-6) shown in Table 1 and Table 2 was obtained.

On the other hand, in the case of Examples of Manufacture 2 and 5, the temperature was maintained at 95° C. for 30 minutes after adding the added mixture (1) shown in Table 1 and Table 2, and then the added mixture (2) shown in Table 1 and Table 2 was added at a constant rate of addition over a period of 1 hour at a temperature of 95° C. Subsequently, the temperature of 95° C. was maintained for 1 hour and, after adding the supplementary catalyst, the mixture was maintained at 95° C. for 3 hours and the liquid non-aqueous polymer dispersion (A-2 or A-5) shown in Table 1 and Table 2 was obtained.

Comparative Example of Manufacture 1

As shown in Table 2, the liquid non-aqueous polymer dispersion (B-1) which provides a comparative example was obtained in the same way as in Example of Manufacture 1 except that the amount of FM-1 used was reduced.

The liquid non-aqueous polymer dispersions A-1, A-6 and B-1 were all stable even after being left to stand for 1 month at 20° C., and no settling out of the particle component, phase separation or change in viscosity, for example, was observed.

TABLE 1

|  |  |  | Example of Manufacture | | | |
|---|---|---|---|---|---|---|
|  |  |  | 1 | 2 | 3 | 4 |
| Name of Liquid Dispersion |  |  | A-1 | A-2 | A-3 | A-4 |
| Initially Introduced (parts) | Dispersion Stabilizer Solution |  | 20 | 16 | 14 | 20 |
|  | Xylene |  | 8.5 | 14.2 | 17.9 | 8.5 |
|  | Mineral spirit |  | 10 | 10 | 18 | 10 |
| Added Mixture (1) (parts) | FM-1 | *1 | 34 | — | — | 29.6 |
|  | 4-HBA | *2 | — | 22.4 | — | — |
|  | TPGMA | *3 | — | — | 9.6 | — |
|  | EA | *4 | — | — | — | — |
|  | 1,6-HDMA | *5 | 2 | — | — | — |
|  | AA | *6 | — | — | 1.0 | 3.2 |
|  | GMA | *7 | — | — | 1.0 | 3.2 |
|  | AN | *8 | 4 | 3.2 | 1.3 | 4 |
|  | Xylene |  | 10 | 10 | 18 | 10 |
|  | Mineral Spirit |  | 10 | 10 | 18 | 10 |
|  | TBPEH | *9 | 0.4 | 0.3 | 0.1 | 0.4 |
| Added Mixture (2) (parts) | HDI | *10 | — | 6.4 | — | — |
|  | Xylene |  | — | 6.4 | — | — |
| Supplementary Catalyst (parts) | TBPEH | *9 | 0.1 | 0.1 | 0.1 | 0.1 |
|  | Mineral spirit |  | 1 | 1 | 1 | 1 |
| Involatile Fraction Content | (%) |  | 50 | 40 | 20 | 50 |
| Particle Component Content | (%) |  | 40 | 32 | 13 | 40 |
| Particle Component Particle Size | (μm) |  | 0.3 | 0.3 | 0.2 | 0.3 |
| Structural Unit Content | (%) | *11 | 85 | 70 | 74 | 74 |
| Dispersion Stabilizer Content | (%) |  | 10 | 8 | 7 | 10 |

TABLE 2

|  |  |  | Example of Manufacture | | Comparative Example of Manufacture 1 |
|---|---|---|---|---|---|
|  |  |  | 5 | 6 |  |
| Name of Liquid Dispersion |  |  | A-5 | A-6 | B-1 |
| Initially Introduced (parts) | Dispersion Stabilizer Solution |  | 40 | 60 | 20 |
|  | Xylene |  | — | — | 8.5 |
|  | Mineral spirit |  | 12.6 | 8.7 | 10 |
| Added Mixture (1) (parts) | FM-1 | *1 | — | — | 6 |
|  | 4-HBA | *2 | 15 | — | — |
|  | TPGMA | *3 | — | 8 | — |
|  | EA | *4 | 6 | 8 | 28 |
|  | 1,6-HDMA | *5 | — | 2 | 2 |
|  | AA | *6 | — | — | — |
|  | GMA | *7 | — | — | — |
|  | AN | *8 | 3 | 2 | 4 |
|  | Xylene |  | 5 | 5 | 10 |
|  | Mineral Spirit |  | 5 | 5 | 10 |
|  | TBPEH | *9 | 0.3 | 0.2 | 0.4 |
| Added Mixture (2) (parts) | HDI | *10 | 6 | — | — |
|  | Xylene |  | 6 | — | — |
| Supplementary Catalyst (parts) | TBPEH | *9 | 0.1 | 0.1 | 0.1 |
|  | Mineral spirit |  | 1 | 1 | 1 |
| Involatile Fraction Content | (%) |  | 50 | 50 | 50 |
| Particle Component Content | (%) |  | 30 | 20 | 40 |
| Particle Component Particle Size | (μm) |  | 0.3 | 0.3 | 0.3 |
| Structural Unit Content | (%) | *11 | 50 | 40 | 15 |
| Dispersion Stabilizer Content | (%) |  | 20 | 30 | 10 |

Footnotes for Table 1 and Table 2
*1 FM-1: Purakuseru FM-1 (Trade Name, made by Daiseru Kagaku Kogyo (Co.), vinyl based monomer in which 1 mol of ε-caprolactam has been added to 1 mol of 2-hydroxyethyl methacrylate, a vinyl based monomer represented by the general formula [2])
*2 4-HBA: 4-Hydroxybutyl acrylate (Vinyl based monomer represented by general formula [2])
*3 TPGMA: Tripropyleneglycol monomethacrylate (Vinyl based monomer represented by general formula [2])
*4 EA: Ethyl acrylate
*5 1,6-HDMA: 1,6-Hexanediol dimethacrylate
*6 AA: Acrylic acid
*7 GMA: Glycidyl methacrylate
*8 AN: Acrylonitrile
*9 TBPEH: t-Butylperoxy 2-ethylhexanoate
*10 HDI: Hexamethylene diisocyanate
*11 Content of structural units represented by general formula [1] contained in the polymer component

EXAMPLES 1–4

The liquid non-aqueous polymer dispersions obtained in the abovementioned examples of manufacture were added to a clear coat paint for two-coat one-bake purposes and the performances of the paint films obtained were investigated.

1) Preparation of Acrylic Resin for Clear Coat Purposes

Sorubesso 100 (33 parts) and 4 parts of n-butanol were introduced into a four-necked flask which had been fitted with a stirrer, a reflux condenser, a thermometer and a dropping funnel and heated to 120° C. Subsequently, the mixture indicated below was added at a temperature of 120° C. and, after maintaining for 1 hour at 120° C., 0.2 part of t-butylperoxy 2-ethylhexanoate and 1 part of Sorubesso 100 were added and the mixture was maintained for 2 hours at 120° C. and an acrylic resin solution for clear coat purposes of involatile fraction 60% (referred to hereinafter as AR-1 solution) was obtained.

| n-Butyl methacrylate | 36.6 parts |
| 2-Ethylhexyl methacrylate | 6.6 parts |
| 2-Hydroxypropyl methacrylate | 15.6 parts |
| Acrylic acid | 1.2 parts |
| t-Butyloxy 2-ethylhexanoate | 1.8 parts |

2) Production of Clear Coat Paints

Mixtures of the compositions shown in Table 3 were stirred and clear coat paints were formed, and then the paints were diluted to the paint viscosity (Ford Cup. No.4, 25 seconds at 20° C.) with a thinner (Sorubesso 100/n-butanol= 9/1, ratio by weight).

TABLE 3

|  |  | Example | | | | (parts) |
|---|---|---|---|---|---|---|
|  |  | 1 | 2 | 3 | 4 | |
| AR-1 Solution | *1 | 100 | 116.6 | 100 | — | |
| Rumifuron LF200 | *2 | — | — | — | 120 | |
| Saimeru 303 | *3 | 20.4 | — | — | 20.4 | |

TABLE 3-continued

|  |  | Example (parts) | | | |
|---|---|---|---|---|---|
|  |  | 1 | 2 | 3 | 4 |
| Yuuban 20HS | *4 | — | 28.6 | 28.6 | — |
| Desmodure BL-3175 | *5 | — | — | 6.7 | — |
| A-1 | *6 | 40 | — | — | — |
| A-2 | *7 | — | 25 | 37.5 | — |
| A-6 | *8 | — | — | — | 40 |
| PTSA Solution | *9 | 2.5 | — | — | 2.5 |
| Tinuvin 900 | *10 | 1 | 1 | 1 | 1 |
| Tinuvin 292 | *11 | 1 | 1 | 1 | 1 |
| Modaflow | *12 | 0.5 | 0.5 | 0.5 | 0.5 |
| Xylene |  | 10 | 10 | 10 | 10 |
| n-Butanol |  | 2 | 2 | 2 | 2 |
| DBTDL Solution | *13 | — | — | 1 | — |

Footnotes for Table 3
*1 The acrylic resin solution obtained on preparing an acrylic resin for clear coat purposes in 1) above.
*2 Trade name, fluorine resin solution made by Asahi Glass (Co.), involatile fraction 50%
*3 Trade name, methylated melamine resin, made by the American Cyanamid Co., involatile fraction 98%
*4 Trade name, butylated melamine resin solution, made by Mitsui Toatsu Kagaku (Co.), involatile fraction 70%
*5 Trade name, block isocyanate solution of hexamethylene diisocyanate trimer, made by the Bayer Co., involatile fraction 75%
*6 See Table 1
*7 See Table 1
*8 See Table 2
*9 A 20% isopropanol solution of p-toluenesulfonic acid
*10 Trade name, ultraviolet absorber made by the Ciba Geigy Co.
*11 Trade name, photostabilizer made by the Ciba Geigy Co.
*12 Trade name, leveling agent made by Monsanto Co.
*13 A 50% xylene solution of dibutyltin dilaurate 3) Paint Film Formation Cationic electrodeposition paint Akua No.4200 (trade name, made by Nippon Yushi (Co.)) was electro-deposition painted in such a way as to provide a dry film thickness of 20 m on a zinc phosphate treated mild steel sheet and baked for 25 minutes at 175° C., and then the intermediate coat paint Haiepiko No.100 (trade name, made by Nippon Yushi (Co.)) was air spray painted so as to provide a dry film thickness of 40 m, and this was baked for 30 minutes at 140° C.

Berukooto No.6000 black base coat paint (trade name, made by Nippon Yushi(Co.)) was air. spray painted in such a way as to provide a dry film thickness of 20 $\mu$m onto this electrodeposition and intermediate coat painted sheet and, after setting for 30 minutes at 20° C., the diluted clear paint top coat paints shown in Table 3 were air spray painted in such a way as to provide a dry film thickness of 40 m, and then the test sheets were completed by baking for 30 minutes at 140° C. These test sheets were subjected to acid resistance and scratch resistance tests. The results, as shown in Table 4, indicated that all of the paint films had excellent paint film properties.

Test sheets were obtained by painting Berukooto No.6000 white base coat paint (trade name, made by Nippon Yushi (Co.)) instead of the Berukooto No.6000 black base coat onto the same electro-deposited and intermediate coat painted sheet as described above and then painting with the diluted clear paint clear coat paints shown in Table 3 and baking for 30 minutes at 140° C. Here, the test sheet was subjected to color measurement and then it was subjected to color measurement again after baking for 120 minutes at 160° C., and the color difference before and after baking for 120 minutes at 160° C. was measured. The results, as shown in Table 4, indicate that all these paints also had excellent non-yellowing properties.

TABLE 4

|  |  | Example 1 | Example 2 | Example 3 | Example 4 |
|---|---|---|---|---|---|
| Liquid Non-aqueous Polymer Dispersion |  | A-1 | A-2 | A-2 | A-6 |
| Structural Unit of Formula [1] Content of the Particle Component (%) |  | 85 | 70 | 70 | 40 |
| Amount of Particle Component in the Total Paint Resin Solid Fraction (%) |  | 16 | 8 | 13 | 24 |
| Main Resin in the Paint |  | Acrylic Resin | Acrylic Resin | Acrylic Resin | Fluorine Resin |
| Paint Resin Crosslinking Agent |  | Melamine | Melamine | Melamine Block NCO | Melamine |
| Painting System |  | Two-coat one-bake | Two-coat one-bake | Two-coat one-bake | Two-coat one-bake |
| Paint Film Performance | Acid Resistance*2 | ◯ | ◯ | ◯ | ◯ |
|  | Scratch Resistance*3 | ◯ | ◯ | ◯ | ◯ |
|  | Non-yellowing*4 Properties | ◯ | ◯ | ◯ | ◯ |

Footnotes for Table 4
*1 Block NCO: Block isocyanate crosslinking agent
*2 Acid Resistance: Aqueous sulfuric acid solution of pH 3 was applied as a 0.2 ml spot to the test sheet and rinsed off with water after being heated to 60° C. for 1 hour, and the spot was then assessed visually.
◯ No spot to be seen at all.
Δ A spot could just be distinguished.
X A spot such that the gloss of the paint film was markedly reduced was seen.
*3 Scratch Resistance: Muddy water (a mixture of dust type 8 for testing purposes made by the Japan Powder Technology Association/water/neutral detergent = 20/99/1 (ratio by weight)) was coated with a brush onto the test sheet and then the test sheet was subjected to 10 seconds rotation at 150 rpm of a car washing brush in an automatic car wash and then rinsed with water and cleaned. This operation was repeated twice and then the extent of scratching on the test sheet surface was measured in terms of the L* value using a color difference meter (CR-339, trade name, made by Minolta Camera (Co.)). The ΔL* value was calculated using the following formula and the scratch resistance was evaluated with this value. ΔL* = L* value after test − L* value before test
◯: ΔL* ≦ 3.0
Δ: 3.0 < ΔL* < 5.0
X: ΔL* ≧ 5.0
*4 Non-yellowing Properties: Evaluated by the color difference (ΔE value) before and after baking the white test sheet for 120 minutes at 160° C.
◯: ΔE ≦ 1.0
Δ: 1.0 < ΔE < 3.0
X: ΔE ≧ 3.0

EXAMPLES 5–7

The liquid non-aqueous polymer dispersions obtained in the aforementioned examples of manufacture were added to a one-coat paint and the performances of the paint films obtained were investigated.

1) Preparation of Acrylic Resin

Using the same apparatus as for the preparation of the acrylic resin in 1) of Examples 1–4, an acrylic resin solution (referred to hereinafter as AR-2 solution) of involatile fraction 60% was obtained in just the same way as in 1) of Examples 1–4 except that an acrylic monomer and polymerization initiator mixture of the composition indicated below was used.

| | |
|---|---|
| Styrene | 18 parts |
| Lauryl methacrylate | 15.6 parts |
| Cyclohexyl methacrylate | 9.6 parts |
| 2-Hydroxypropyl methacrylate | 15.6 parts |
| Acrylic Acid | 1.2 parts |
| t-Butylperoxy 2-ethylhexanoate | 1.8 parts |

2) Preparation of One-coat Paints

Mixtures of the compositions shown in Table 5, except for the melamine resin, were introduced into a paint shaker and, after dispersion to a viscosity of less than 10 μm, the melamine resin was added and the mixture was stirred to prepare one-coat paints. Next, the paints were diluted to the paint viscosity (Ford cup No.4, 25 seconds at 20° C.) with thinner (xylene/hexyl acetate=1/1, ratio by weight).

TABLE 5

| | | Example 5 (Parts) | | Example 6 | | Example 7 | |
|---|---|---|---|---|---|---|---|
| | | black | white | black | white | black | white |
| Raaben 420 | *1 | 2 | — | 2 | — | 2 | — |
| Titanium Oxide JR602 | *2 | — | 80 | — | 80 | — | 80 |
| AR-2 Solution | *3 | 100 | 100 | 83.3 | 83.3 | — | — |
| Aropirattsu 1713 | *4 | — | — | — | — | 116.7 | 116.7 |
| Saimeru 303 | *5 | 20.4 | 20.4 | — | — | 20.4 | 20.4 |
| Yuuban 20HS | *6 | — | — | 26.7 | 26.7 | — | — |
| A-3 | *7 | 100 | 100 | — | — | — | — |
| A-4 | *8 | — | — | 60 | 60 | — | — |
| A-5 | *9 | — | — | — | — | 20 | 20 |
| PTSA Solution | *10 | 2.5 | 2.5 | — | — | 2.5 | 2.5 |
| Modaflow | *11 | 1.0 | 1.0 | 1.0 | 1.0 | 1.0 | 1.0 |
| Xylene | | 10 | 10 | 10 | 10 | 10 | 10 |
| n-Butanol | | 2 | 2 | 2 | 2 | 2 | 2 |
| Butylcellosolve | | 3 | 3 | 3 | 3 | 3 | 3 |

Footnotes for Table 5
*1 Trade name, carbon black, made by the Columbia Carbon Co.
*2 Trade name, titanium dioxide, made by Teikaku Kako (Co.)
*3 The aforementioned acrylic resin solution obtained in the production of acrylic resin in 1) above.
*4 Trade name, silicon modified polyester resin solution, made by Nippon Shokubai Kagaku Kogyo (Co.)
*5, *6 See Table 3
*7, *8 See Table 1
*9 See Table 2
*10, *11 See Table 3

3) Formation of Paint Films

The diluted one-coat paints shown in Table 5 were air spray painted so as to provide a dry film thickness of 40 m onto the same electro-deposited and intermediate coat painted sheets as in Examples 1–4, and test sheets were obtained on baking for 30 minutes at 140° C. With each of the test sheets, the acid resistance and scratch resistance tests were carried out with the black test sheets in the same way as in Examples 1–4. The results, as shown in Table 6, indicated that all of the paint films had excellent paint film performance.

On the other hand, the color difference was measured in the same way as in Examples 1–4 using white test sheets. The results, as shown in Table 6, indicated that all of the paint films had excellent non-yellowing performance.

TABLE 6

| | Example 5 | Example 6 | Example 7 |
|---|---|---|---|
| Liquid Non-aqueous Polymer Dispersion | A-3 | A-4 | A-5 |

TABLE 6-continued

| | | Example 5 | Example 6 | Example 7 |
|---|---|---|---|---|
| Structural Unit of Formula [1] Content of the Particle Component (%) | | 74 | 74 | 50 |
| Amount of Particle Component in the Total Paint Resin Solid Fraction (%) | | 6 | 8 | 12 |
| Main Resin in the Paint | | Acrylic Resin | Acrylic Resin | Silicon Modified Polyester Resin |
| Paint Resin Crosslinking Agent | | Melamine | Melamine | Melamine |
| Painting System | | One-coat | One-coat | One-coat |
| Paint Film Performance | Acid Resistance *1 | ○ | ○ | ○ |
| | Scratch Resistance *2 | ○ | ○ | ○ |
| | Non-yellowing Properties *3 | ○ | ○ | ○ |

Footnotes for Table 6
*1–*3: See Table 4.

COMPARATIVE EXAMPLES 1 and 2

1) Preparation of Clear Coat Paints

Mixtures of the compositions shown in Table 7 were stirred and clear coat paints were prepared, and then they were diluted to the painting viscosity (Ford cup No.4, 20 seconds at 20° C.) with thinner (Sorubesso 100/n-butanol=9/1, ratio by weight).

TABLE 7

| | | Comparative Example 1 | Comparative Example 2 |
|---|---|---|---|
| AR-1 Solution | *1 | 100 | 111.7 |
| Saimeru 303 | *2 | 20.4 | — |
| Desmodure BL-3175 | *3 | — | 44 |
| A-1 | *4 | 40 | — |
| PTSA Solution | *5 | 2.5 | — |
| DBTDL Solution | *6 | — | 1 |
| Tinuvin 900 | *7 | 1 | 1 |
| Tinuvin 292 | *8 | 1 | 1 |
| Modaflow | *9 | 0.5 | 0.5 |
| Xylene | | 10 | 15 |
| n-Butanol | | 2 | 3 |

Footnotes For Table 7
*1–*9: See Table 3.

2) Paint Film Formation

Test sheets were prepared in just the same way as in Example 1–4 and acid resistance, scratch resistance and yellowing tests were carried out.

The results, as shown in Table 8, in Comparative Example 1 showed that the acid resistance and scratch resisting capacity were poor since the particle component in the liquid non-aqueous polymer dispersion had less than 30 percent by weight of the structural units represented by the aforementioned general formula [1]. Furthermore, in Comparative Example 2 the scratch resistance was inadequate because no elasticity imparting agent for paints of this present invention had been included. Furthermore, the paint film yellowed considerably since block isocyanate compound was used in a large amount as crosslinking agent in accordance with the method described in Japanese Patent Kokai H2-305873.

TABLE 8

| | Comparative Example 1 | Comparative Example 2 |
|---|---|---|
| Liquid Non-aqueous Polymer Dispersion | B-1 *4 | — |
| Structural Unit of Formula [1] Content of the Particle Component (%) | 15 | — |
| Amount of Particle Component in the Total Paint Resin Solid Fraction (%) | 16 | — |
| Main Resin in the Paint | Acrylic resin | Acrylic resin |
| Paint Resin Crosslinking Agent | Melamine resin | Block NCO *5 |
| Painting System | Two-coat one-bake | Two-coat one-bake |
| Paint Film Performance — Acid Resistance *1 | Δ | ○ |
| Paint Film Performance — Scratch Resistance *2 | X | Δ |
| Paint Film Performance — Non-yellowing Properties *3 | ○ | X |

Footnotes for Table 8
*1–*3: See Table 4.
*4: See Table 2
*5: Blocked isocyanate crosslinking agent

What is claimed is:

1. An elasticity imparting additive for paint, comprising polymer particles having structural units of the formula

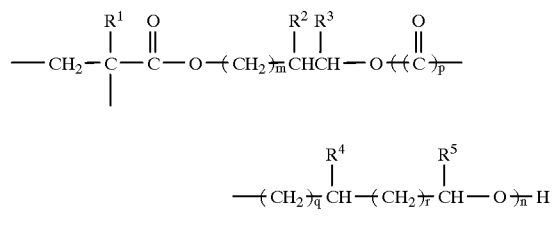

wherein $R^1$–$R^5$ each independently is a hydrogen atom or a methyl group, m is an integer of 0–2, n is an integer of 0–10, p is 0 or 1, q is an integer of 0–3, and r is an integer of 0–3; and further wherein said polymer particles comprise at least one vinyl based polymer prepared by:

(a) polymerizing a mixture comprising at least 30% by weight ethylenically unsaturated monomers of the formula

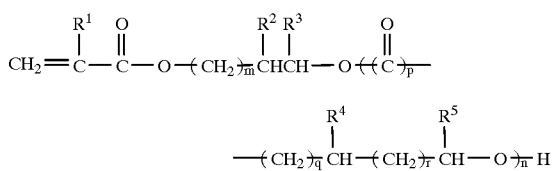

to obtain a hydroxyl-functional polymer and (b) reacting the hydroxyl-functional polymer with at least one polyisocyanate to obtain crosslinked polymer particles of the hydroxyl-functional polymer.

2. An elasticity imparting additive according to claim 1, wherein the unsaturated monomers having hydroxyl functionality are selected from the group consisting of: hydroxyalkyl esters of acrylic and methacrylic acids, lactone adducts and alkylene oxide adducts thereof; and mixtures thereof.

3. An elasticity imparting additive according to claim 1, wherein the unsaturated monomers having hydroxyl functionality are selected from the group consisting of: 2-hydroxyethyl (meth)acrylate, 2-hydroxypropyl (meth) acrylate, 3-hydroxypropyl (meth)acrylate, 4-hydroxybutyl (meth)acrylate, lactone adducts of 2-hydroxyethyl (meth) acrylate, alkylene oxide adducts of methacrylic acid, alkylene oxide adducts of 4-hydroxybutyl (meth)acrylate, and mixtures thereof.

4. An elasticity imparting additive according to claim 1, wherein the polyisocyanate is selected from the group consisting of hexamethylene diisocyanate, isophorone diisocyanate, tolylene diisocyanate, xylylene diisocyanates, diphenylmethane diisocyanate, 2,6-diisocyanatomethylcaproate, 4,4'-methylenebis (cyclohexylisocyanate), methylcyclohexane-2,4-diisocyanate, methylcyclohexane-2,6-diisocyanate, 1,3-(isocyanatomethyl)cyclohexane, trimethylhexane diisocyanate, dimer acid diisocyanate, and mixtures thereof.

5. An elasticity imparting additive according to claim 1, wherein said additive is a dispersion comprising from about 40 to about 90 weight percent organic solvent, from about 10 to about 50 weight percent of the polymer particles, and from about 5 to about 40 weight percent of a dispersion stabilizer.

6. An elasticity imparting additive according to claim 1, wherein said additive is a dispersion comprising from about 50 to about 80 weight percent organic solvent, from about 10 to about 40 weight percent of the polymer particles, and from about 5 to about 30 weight percent of a dispersion stabilizer.

7. A method of manufacturing an elasticity imparting additive for paint, comprising the steps of:

(a) polymerizing, in organic solvent in the presence of a dispersion stabilizer, a mixture comprising at least 30% by weight ethylenically unsaturated monomers of the formula

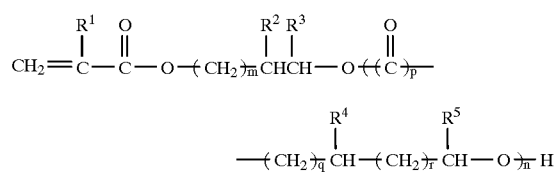

wherein $R^1$–$R^5$ each independently is a hydrogen atom or a methyl group, m is an integer of 0–2, n is an integer of 0–10, p is 0 or 1, q is an integer of 0–3, and r is an integer of 0–3, to obtain a hydroxyl-functional polymer and (b) reacting the polymer with at least one polyisocyanate to obtain a non-aqueous dispersion of a crosslinked polymer having structural units of the formula

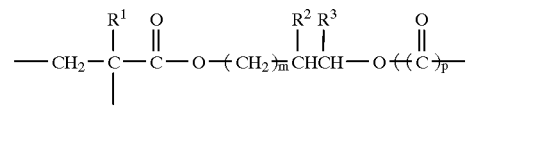

8. A method according to claim 7, wherein said dispersion stabilizer is the reaction product of a mixture comprising a member selected from the group consisting of the adduct of (meth)acrylic acid and versatic acid glycidyl ester and the adduct of glycidyl (meth)acrylate with poly-12-hydroxystearic acid.

9. A method according to claim 7, wherein the unsaturated monomers having hydroxyl functionality are selected from the group consisting of: 2-hydroxyethyl (meth)acrylate, 2-hydroxypropyl (meth)acrylate, 3-hydroxypropyl (meth)acrylate, 4-hydroxybutyl (meth)acrylate, lactone adducts of 2-hydroxyethyl (meth)acrylate, alkylene oxide adducts of methacrylic acid, alkylene oxide adducts of 4-hydroxybutyl (meth)acrylate, and mixtures thereof.

10. A method according to claim 7, wherein the polyisocyanate is selected from the group consisting of hexamethylene diisocyanate, isophorone diisocyanate, tolylene diisocyanate, xylylene diisocyanates, diphenylmethane diisocyanate, 2,6-diisocyanatomethylcaproate, 4,4'-methylenebis(cyclohexylisocyanate), methylcyclohexane-2,4-diisocyanate, methylcyclohexane-2,6-diisocyanate, 1,3-(isocyanatomethyl)cyclohexane, trimethylhexane diisocyanate, dimer acid diisocyanate, and mixtures thereof.

11. A method according to claim 7, wherein a dispersion comprising from about 40 to about 90 weight percent organic solvent, from about 10 to about 50 weight percent of the polymer particles, and from about 5 to about 40 weight percent of a dispersion stabilizer is obtained.

12. A method according to claim 7, wherein a dispersion comprising from about 50 to about 80 weight percent organic solvent, from about 10 to about 40 weight percent of the polymer particles, and from about 5 to about 30 weight percent of a dispersion stabilizer is obtained.

13. A method of imparting elasticity to a coating, comprising the steps of:

(a) providing an elasticity imparting additive for paint prepared by a method including the steps of
(i) polymerizing, in organic solvent in the presence of a dispersion stabilizer, a mixture comprising at least 30% by weight ethylenically unsaturated monomers of the formula

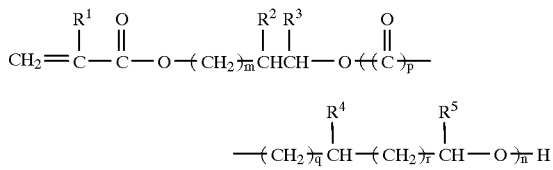

wherein $R^1$–$R^5$ each independently is a hydrogen atom or a methyl group, m is an integer of 0–2, n is an integer of 0–10, p is 0 or 1, q is an integer of 0–3, and r is an integer of 0–3, to obtain a hydroxyl-functional polymer and (ii) reacting the polymer with at least one polyisocyanate to obtain a non-aqueous dispersion of polymer particles having structural units of the formula

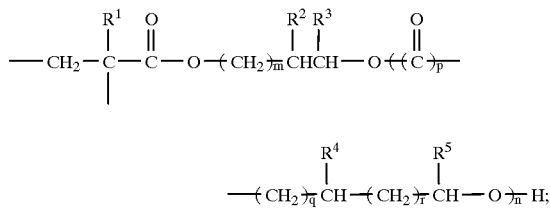

(b) adding an effective amount of said elasticity imparting additive to a paint composition to obtain a modified paint; and (c) applying said modified paint to a substrate to obtain a coating.

14. A method according to claim 13, wherein said elasticity imparting additive is added to said paint composition in an amount so that the polymer particles are from about 5 to about 30 percent by weight of the total paint resin solid fraction.

15. A method according to claim 13, wherein said elasticity imparting additive is added to said paint composition in an amount so that the polymer particles are from about 10 to about 25 percent by weight of the total paint resin solid fraction.

16. A method according to claim 13, wherein the unsaturated monomers having hydroxyl functionality are selected from the group consisting of: 2-hydroxyethyl (meth)acrylate, 2-hydroxypropyl (meth)acrylate, 3-hydroxypropyl (meth)acrylate, 4-hydroxybutyl (meth)acrylate, lactone adducts of 2-hydroxyethyl (meth)acrylate, alkylene oxide adducts of methacrylic acid, alkylene oxide adducts of 4-hydroxybutyl (meth)acrylate, and mixtures thereof.

17. A method according to claim 13, wherein said dispersion comprises from about 40 to about 90 weight percent organic solvent, from about 10 to about 50 weight percent of the polymer particles, and from about 5 to about 40 weight percent of a dispersion stabilizer.

18. A method according to claim 13, wherein said dispersion comprises from about 50 to about 80 weight percent organic solvent, from about 10 to about 40 weight percent of the polymer particles, and from about 5 to about 30 weight percent of a dispersion stabilizer.

* * * * *